July 28, 1936.  F. W. SCHEFFLER  2,048,972
ADJUSTABLE SELF ALIGNING BEARING
Filed March 29, 1934  2 Sheets-Sheet 1
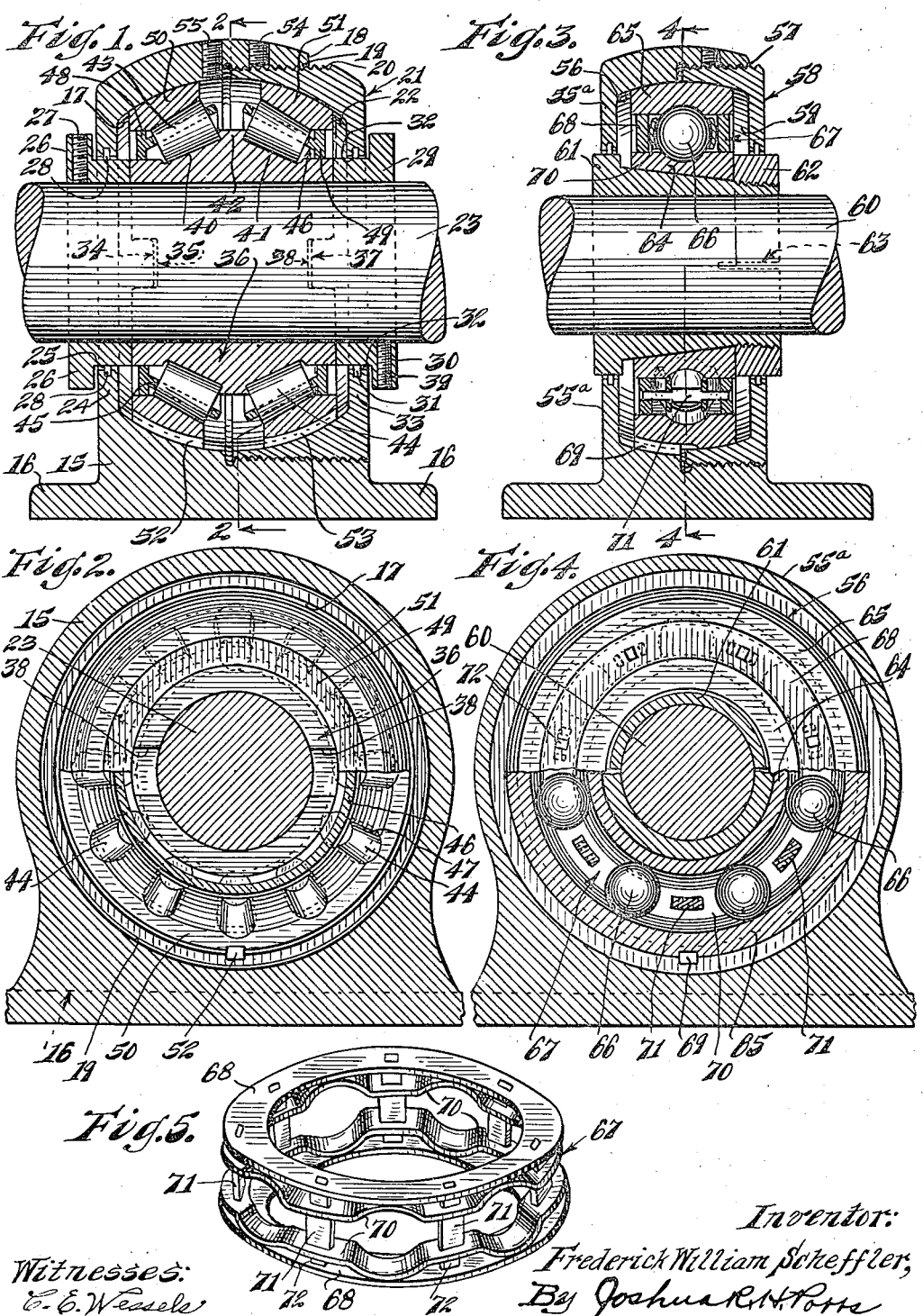

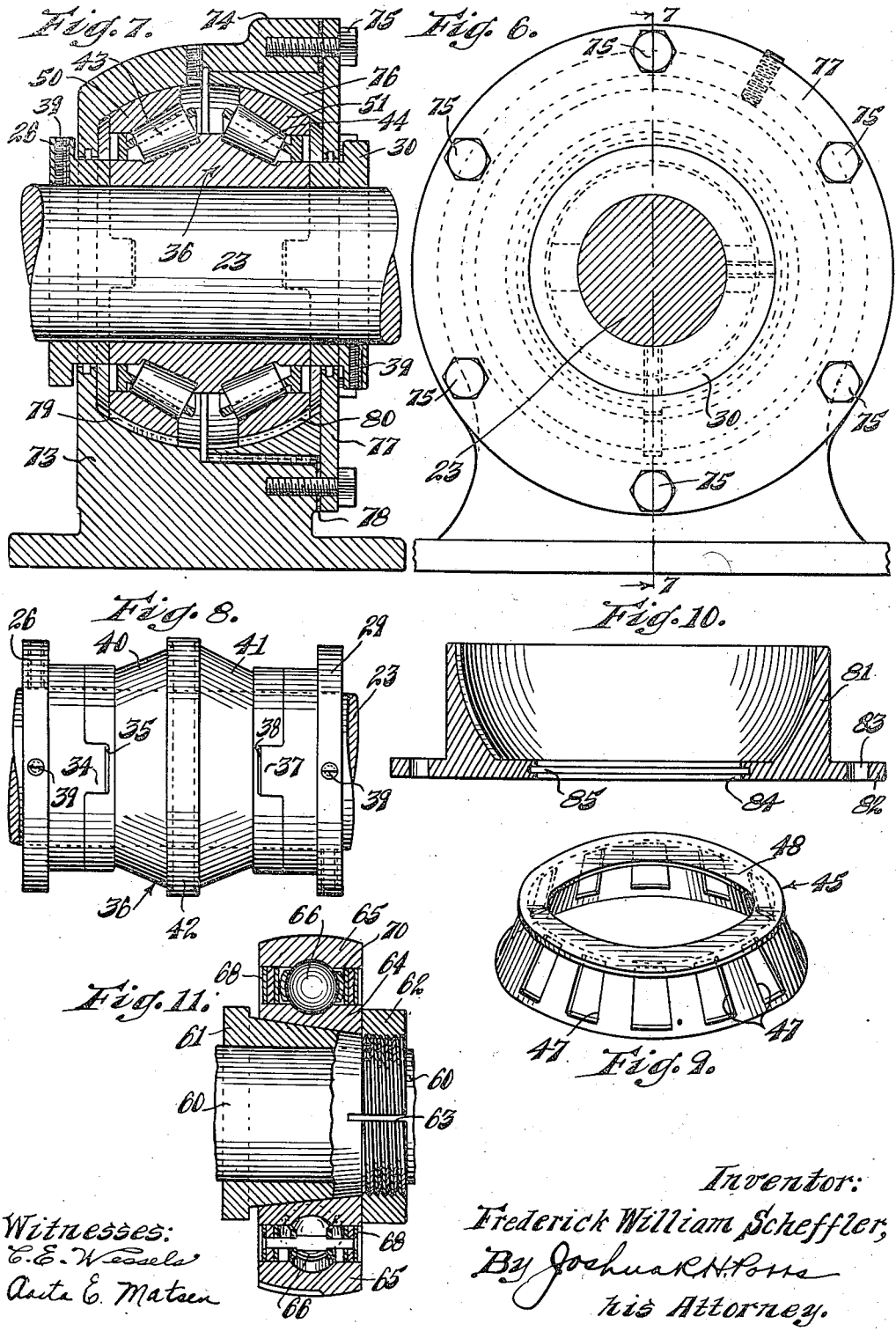

Patented July 28, 1936

2,048,972

UNITED STATES PATENT OFFICE 2,048,972

ADJUSTABLE SELF-ALIGNING BEARING

Frederick William Scheffler, Joliet, Ill.

Application March 29, 1934, Serial No. 717,876

6 Claims. (Cl. 308—189)

My invention relates to improvements in adjustable self-aligning bearings of the type ordinarily supported by pillow blocks and adapted to reduce friction of a shaft rotating in said bearing. I am aware that self-aligning bearings for such a purpose have been provided heretofore, and an example of this type of bearing is shown and described in my Patent No. 1,928,114, issued September 26, 1933, on an application filed March 18, 1932, and entitled "Anti-friction bearing."

Heretofore no adjustable self-aligning bearing has been provided and consequently when the aligning member becomes worn it is necessary to replace parts. Such replacement is not only expensive in regard to the price of replacement parts, but an additional expense is created because of the necessary dismantling of the line shafting in the plant. Such line shafting is usually employed as an intermediate power transfer unit between the source of power and the machine which it is desired to operate. It can thus be readily seen that such delays entail great expense and a great amount of work.

My invention makes it possible to adjust the bearing after a period of use without replacing any parts and thus keep the shaft in proper alignment and free from the vibration which is the direct result of wear.

Another object of my invention is to provide a self-aligning bearing having a large bearing surface carried by the aligning members and yet reduce the number of parts ordinarily employed in self-aligning bearings. Even with the reduction in number of parts my adjustability feature still remains and my many advantages are obtained at a smaller cost than any previous self-aligning bearings.

Another object is the provision of a self-aligning bearing having a grease retainer formed integrally with the bearing member. Various grease retainers have heretofore been made independently of the bearings and added to the shafting as an accessory. However, in my invention the grease retainer may be formed integrally with or attached to the ball or roller cage. Such construction reduces the number of manufacturing operations and consequently reduces costs.

Other objects will appear hereinafter.

My invention may be best understood by reference to the accompanying drawings, in which:

Fig. 1 is a vertical sectional view of the preferred form of my invention;

Fig. 2 is a sectional view taken substantially on the line 2—2 of Fig. 1;

Fig. 3 is a vertical sectional view similar to Fig. 1, of a modified form of my device;

Fig. 4 is a sectional view taken substantially on the line 4—4 of Fig. 3.

Fig. 5 is a perspective view of the type of ball cage employed in the type of bearing shown in Figs. 3 and 4;

Fig. 6 is an elevational view of a modified form of bearing having an internal construction similar to that of the bearing shown in Fig. 1;

Fig. 7 is a sectional view taken substantially on the line 7—7 of Fig. 6;

Fig. 8 is an elevational view of the inner bearing sleeve which is keyed to the line shaft;

Fig. 9 is a perspective view of the roller cage employed in the type of bearing shown in Figs. 1, 2, 6, and 7;

Fig. 10 is a detail view in section of the adjusting bearing member; and

Fig. 11 is a detail view of the inner aligning member and illustrates a modified form of grease retainer.

Referring now to Fig. 1, my device comprises a housing pillow block 15 having attaching lugs 16 for attachment to a supporting member. The housing 15 carries an internal quasi-hemispherical bearing surface 17. The housing 15 is open at the end 18 and is provided with internal threads 19 for engagement by the external threads 20 of an adjusting aligning bearing member 21. The member 21 is provided with an internal quasi-hemispherical bearing surface 22, and when the member 21 is screwed into the internal threads of housing 15 the bearing surface 17 and the bearing surface 22 form a bearing surface substantially like that which would be provided by a hollow sphere. Theoretically, the center for a spherical surface formed by the surfaces 17 and 22 is located on the longitudinal axis of a cooperating line shaft 23.

The end wall 24 of the housing 15 is provided with an annular opening 25 through which the locking collar 26 is extended. The collar 26 is slid onto shaft 23 and keyed thereto by a set screw bore 27. A protecting ring 28 may be placed in an appropriate groove in the wall of annular opening 25 and by tight-fitting engagement with the external wall of collar 26 prevent the entrance of foreign matter into the spherical bearing surface. A similar collar 29 may be slid onto the shaft 23 from an opposite direction and locked to shaft 23 by set screw bore 30. A ring 31 similar to ring 28 may be employed in the annular opening 32 in the end wall 33 of the bearing member 21.

A better understanding of the function of the collars 26 and 29 may be gained from an inspection of Fig. 8. A tongue 34 is provided on the inner end of collar 28 and adapted to cooperate with a notch 35 carried in the outer end of the bearing sleeve member 36. A similar tongue 37 is carried on the inner end of collar 29 and adapted to cooperate with a notch 38 carried on the opposite outer end of sleeve 36. The collars, of course, prevent independent rotation of the shaft 23 with relation to the sleeve 36 when the parts are in proper position and the set screws 39 tightened in bores 27 and 30.

The sleeve 36 is provided with a pair of oppositely inclined frustro-conical roller races 40 and 41. These races 40 and 41 are separated by an annular band 42 having undercut shoulders adapted to provide a separating abutment for opposing roller members 43 and 44.

The individual rollers of the roller members 43 and 44 are maintained in spaced relation from other rollers of their respective members by appropriate separators or retainers 45 and 46 respectively. These separators or retainers are provided with appropriate slots 47 as shown particularly in Fig. 9 and by having the rollers extended partially through these slots there is no binding or crowding of the rollers against each other. The retainers 45 and 46 are frusto-conical in form and at their smaller ends are provided with annular grease retaining flanges 48 and 49 respectively. The flanges 48 and 49 are of sufficient height to span the distance between the cylindrical surface of bearing sleeve member 36 and the inner cylindrical surface of a pair of bearing rings 50 and 51. The rings 50 and 51 are arranged in opposed relation to each other and carry internal frustro-conical bearing surfaces; exteriorly, said rings are formed into a curvature concentric to that of the spherical bearing surface provided by the interior surface of housing 15 and bearing member 21.

In some instances it may be desirable to key the rings 50 and 51 to the housing 15 and bearing member 21 respectively, so as to prevent rotation of said rings on the longitudinal axis of the shaft 23. Consequently I form appropriate grooves in the bearing surface 17 and bearing member 21 to cooperate with keys 52 and 53 respectively in retaining said rings by engagement with appropriate grooves in the exterior surfaces of rings 50 and 51. When the bearing member 21 is screwed into the open end of housing 15 the ring 51 of course rotates with said bearing member because of the key 53. The rings 50 and 51 remain free to rotate on the center of bearing surfaces 17 and 22. After the shaft 23 is in proper alignment and the bearing member 21 is screwed into the housing 15 the proper distance, a set screw may be tightened into threaded bore 54 for the purpose of locking the bearing member 21 securely to the housing 15. A threaded bore 55 in the upper end of housing 15 may be employed for the purpose of forcing lubricant into the interior of the bearing. An appropriate plug may be employed for closing the bore 55.

Referring now to Fig. 3 a single instead of a duplex type of self-aligning bearing is shown. The housing 55ᵃ is provided with an internal quasi-spherical bearing surface 56 and an open internally threaded end 57. A removable bearing member 58 having an internal quasi-spherical bearing surface 59 is threaded into the end 57. A shaft 60 has a conical sleeve 61 arranged thereon and locked into position on said sleeve by a screw threaded locking ring 62. The sleeve 61 has a slot 63 at its smaller end and by turning locking ring 62 tightly onto the threaded end of sleeve 61 a secure engagement between the shaft 60 and the sleeve 61 is effected. A bearing ring 64 is slid onto sleeve 61 and is of course provided with an internal conical bore so as to cooperate with the conical exterior surface of sleeve 61. An outer bearing ring 65 has an external curvature similar to that formed by the bearing surfaces 56 and 58 and carries a ball race groove on its inner surface. The roller balls travel in said ball race groove and an opposed ball race groove in the exterior surface of ring 64. A retainer cage 67 has grease retainer rings secured to its outer ring 68 faces. A key 69 may be employed in the base of housing 55ᵃ in a manner similar to the key 52 employed in connection with the device shown in Fig. 1.

Fig. 5 illustrates in detail the ball retainer cage employed in the device shown in Fig. 3. The oppositely disposed retaining rings 70 are preferably secured together by rivets 71 having reduced ends 72. The main bodies of the rivets thus separate the retaining rings and the reduced ends 72 extend outwardly from the outer faces of rings 70 a considerable distance. Grease retaining rings 68 may then be secured to the rivets 71 by pressing said rings having appropriate rivet openings therein onto said rivets and riveting the ends of said rivets. If desired, felt retaining rings may be placed between the inner faces of grease retaining rings 68 and the outer faces of rings 70 and even more secure grease retaining connection would then be effected.

A modified form of the duplex bearing shown in Fig. 1 is illustrated in Fig. 7, and the essential differences are as follows: The housing 73 instead of being internally threaded at its open end is provided with a flange 74 in which are carried threaded openings for the reception of clamping bolts 75. The bearing member 76 has an interior quasi-spherical bearing surface similar to the bearing member 21 but is not provided with any means for attachment to the housing 73. A clamping plate 77 is employed for this purpose and carries a central annular shaft receiving opening. Appropriate shim material 78 is interposed between the inner face of clamping plate 77 and the face of flange 74 so that by removing some of said shim material the aligning members of the bearing may be taken up for wear. Keys 79 and 80 are similar in construction to keys 52 and 53.

A modified form of removable bearing surface and bearing member is shown in Fig. 10 and is made integrally to take the place of clamping plate 77 and bearing member 76. Thus the bearing member 81 carries a laterally extending annular flange 82 having bolt openings 83. A central annular shaft opening 84 may carry a sealing ring groove 85.

From the foregoing description it can readily be seen that I have provided a bearing in which the aligning surface is extremely large and one in which adjustment for wear may be readily made. In accomplishing these objects I have eliminated parts and thus provided a device of simple construction. The results and advantages of my device have been heretofore pointed out and the reasons for the same are now apparent.

My novel type of grease retainer is particularly well adapted for use in a self-aligning bearing and hence I have described it in connection herewith. However, it is to be understood that my retainer may be used with other types of bearings to great advantage. Its slight cost and high efficiency adapt it for less costly installations than in self-aligning bearings.

While I have shown and described my preferred forms of construction I do not wish to be limited to the details herein shown, but wish to avail myself of all variations coming within the scope of the appended claims.

Having thus described my invention what I claim as new and desire to secure by Letters Patent is:

1. A device of the character described comprising a housing with an open end, a partial spherical bearing surface carried in said housing, a removable bearing member having a partial spherical inner bearing surface complementing the bearing surface of said housing, means for securing said bearing member to said housing, said means comprising a clamping plate bolted to said housing, an anti-friction bearing within said housing and bearing member, said bearing including a sleeve having a pair of frusto-conical races, a separating band between said races and having retaining grooves therein, and bearing rollers adapted to bear on said races.

2. A device of the character described comprising a housing with an open end, a partial spherical bearing surface carried in said housing, a removable bearing member having a partial spherical inner bearing surface complementing the bearing surface of said housing, means for securing said bearing member to said housing, said housing being provided with an opening, a locking collar located in said opening, a shaft keyed to said collar, said collar being provided with a tongue, a bearing sleeve provided with a notch adapted to cooperate with said tongue, said sleeve being provided with a pair of races and a band to separate said races, said band having undercut shoulders, a pair of opposed outer bearing rings provided with an exterior curvature similar to the bearing surface carried by said housing, anti-friction bearings interposed between said rings and said sleeve and adapted to ride in said races, and a plurality of flanged frustro-conical separating elements for said bearings, said separating elements being provided with slots through which the rollers are adapted to extend, means for keying said rings to the housing and bearing member, said means including grooves in the housing and bearing member and keys for said rings.

3. A device of the character described comprising a housing with an open end, a partial spherical bearing surface carried in said housing, a removable bearing member having a partial spherical inner bearing surface complementing the bearing surface of said housing, means for securing said bearing member to said housing, a shaft, a conical sleeve arranged thereon, a locking ring for locking said sleeve into position, said sleeve being provided with a slot at its smaller end, an inner bearing ring provided with an internal conical bore adapted to cooperate with the conical sleeve and provided also with a ball race groove, an outer bearing ring having an internal curvature similar to that of the inner surface of the housing and the removable bearing member, said outer bearing having a ball race groove on its inner surface, anti-friction bearings interposed between said inner bearing ring and said outer bearing ring, a retainer cage for retaining said anti-friction bearings in spaced condition, said cage being provided with double walled grease retainer rings.

4. A device of the character described comprising a housing with an open end, a partial spherical bearing surface carried in said housing, a bearing member adapted to be substantially inclosed within said housing and having an internal spherical bearing surface complementing the bearing surface of the housing, said bearing member having a laterally extending flat annular flange and a central annular shaft opening provided with a sealing ring groove, said housing being provided with a threaded opening and said bearing member being provided with an opening and clamping bolts adapted to be inserted in said openings, an anti-friction bearing within said housing and bearing member.

5. A device of the character described comprising an open end housing, a partially spherical bearing surface in said housing, an internal bearing member cooperable therewith, grooves in said housing and said bearing member, an interfitting key in said grooves adapted for adjustability, a plurality of bearing rollers, a shaft having a collar secured thereto, a sleeve detachably secured to said collar and having a pair of races separated by a ring, and means on said ring to determine the path of said rollers.

6. In anti-friction bearing means, means for retaining the anti-friction bearing means in spaced relation, said means including a bearing retainer cage comprising oppositely exposed retainer rings having inwardly depressed portions provided with apertures, a plurality of rivets having reduced end portions adapted to extend through said apertures, and a grease retaining ring secured at the end of each said rivet extension, said depressed portions forming grease retaining pockets with said grease retaining rings.

FREDERICK WILLIAM SCHEFFLER.